United States Patent
Cygan, Jr. et al.

(10) Patent No.: US 9,759,177 B2
(45) Date of Patent: *Sep. 12, 2017

(54) SYSTEM AND METHOD FOR CONTROLLING SPARK TIMING BASED ON A DURATION OF A FUEL BURN WITHIN A CYLINDER IN AN ENGINE

(71) Applicant: GM Global Technology Operations LLC, Detroit, MI (US)

(72) Inventors: Gary Robert Cygan, Jr., West Bloomfield, MI (US); Chao F. Daniels, Superior Township, MI (US); Ronald J. Herrin, Troy, MI (US); Jason R. Bartak, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

This patent is subject to a terminal disclaimer.

(21) Appl. No.: 14/689,530

(22) Filed: Apr. 17, 2015

(65) Prior Publication Data

US 2016/0258410 A1    Sep. 8, 2016

Related U.S. Application Data

(60) Provisional application No. 62/128,741, filed on Mar. 5, 2015.

(51) Int. Cl.
*F02P 5/10* (2006.01)
*F02P 5/145* (2006.01)
(Continued)

(52) U.S. Cl.
CPC ............. *F02P 5/145* (2013.01); *F01L 1/344* (2013.01); *F02D 35/02* (2013.01); *F02D 35/028* (2013.01); *F02D 37/02* (2013.01); *F02D 41/0002* (2013.01); *F02P 5/103* (2013.01); *F02P 5/142* (2013.01); *F02P 5/153* (2013.01); *F02D 41/0007* (2013.01); *F02D 41/0087* (2013.01); *F02D 41/1405* (2013.01);
(Continued)

(58) Field of Classification Search
CPC .... F02P 5/103; F02P 5/14; F02P 5/142; F02P 5/15; F02P 5/153; F02D 35/023; F02D 35/024; F02D 35/028
USPC .......................... 123/406.22, 406.26, 406.41
See application file for complete search history.

(56) References Cited

U.S. PATENT DOCUMENTS 4,964,318 A    10/1990    Ganoung
5,050,556 A *   9/1991    Williams .............. F02D 35/022
                                              123/406.28

(Continued)

OTHER PUBLICATIONS

U.S. Appl. No. 14/689,740, filed Apr. 17, 2015, Cygan, Jr. et al.

*Primary Examiner* — Erick Solis (57) ABSTRACT

A system according to the principles of the present disclosure includes a first burn duration module and a spark control module. The first burn duration module determines a first duration of at least a portion of a fuel burn within a cylinder of an engine from a first time when a first predetermined percentage of a mass of fuel within the cylinder is burned to a second time when a second predetermined percentage of the fuel mass is burned. The spark control module controls a spark plug to adjust spark timing of the cylinder based on the first burn duration.

18 Claims, 4 Drawing Sheets

(51) Int. Cl.
    *F02D 35/02*     (2006.01)
    *F01L 1/344*     (2006.01)
    *F02P 5/153*     (2006.01)
    *F02P 5/14*     (2006.01)
    *F02D 37/02*     (2006.01)
    *F02D 41/00*     (2006.01)
    *F02D 41/14*     (2006.01)

(52) U.S. Cl.
    CPC ............... *F02D 2041/001* (2013.01); *F02D 2041/1412* (2013.01); *F02D 2041/1433* (2013.01); *F02D 2250/22* (2013.01); *Y02T 10/42* (2013.01)

(56) References Cited

U.S. PATENT DOCUMENTS

| | | | |
|---|---|---|---|
| 6,279,551 B1 | 8/2001 | Iwano et al. | |
| 8,434,456 B2 * | 5/2013 | Fischer | F02D 35/023 123/305 |
| 9,043,122 B2 | 5/2015 | Glugla et al. | |
| 9,080,523 B1 | 7/2015 | Ulrey et al. | |
| 9,181,892 B2 | 11/2015 | Glugla et al. | |
| 2004/0083717 A1 * | 5/2004 | Zhu | F01N 3/2006 60/284 |
| 2004/0084018 A1 * | 5/2004 | Zhu | F01N 3/2006 123/406.14 |
| 2004/0084020 A1 * | 5/2004 | Daniels | F01N 3/2006 123/406.23 |
| 2012/0065857 A1 | 3/2012 | Nanua | |
| 2013/0184967 A1 | 7/2013 | Kang et al. | |
| 2014/0000552 A1 | 1/2014 | Glugla et al. | |
| 2015/0198099 A1 | 7/2015 | Ulrey et al. | |
| 2015/0204249 A1 | 7/2015 | Glugla et al. | |
| 2015/0252747 A1 | 9/2015 | Glugla et al. | |
| 2015/0316005 A1 | 11/2015 | Madison et al. | |
| 2016/0258380 A1 | 9/2016 | Cygan, Jr. et al. | |
| 2016/0258410 A1 | 9/2016 | Cygan, Jr. et al. | |

\* cited by examiner

SYSTEM AND METHOD FOR CONTROLLING SPARK TIMING BASED ON A DURATION OF A FUEL BURN WITHIN A CYLINDER IN AN ENGINE

CROSS-REFERENCE TO RELATED APPLICATIONS

This application claims the benefit of U.S. Provisional Application No. 62/128,741, filed on Mar. 5, 2015. The disclosure of the above application is incorporated herein by reference in its entirety.

This application is related to U.S. patent application Ser. No. 14/689,740 filed on Apr. 17, 2015 which claims the benefit of U.S. Provisional Application No. 62/128,700 filed on Mar. 5, 2015. The disclosure of the above application is incorporated herein by reference in its entirety.

FIELD

The present disclosure relates to internal combustion engines, and more specifically, to systems and methods for controlling spark timing based on a duration of a fuel burn within a cylinder of an engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. Spark timing and air flow may be the primary mechanisms for adjusting the torque output of spark-ignition engines. Various parameters may be used to characterize combustion of an air/fuel mixture within a cylinder. These parameters may include laminar flame speed and 0-50 burn duration. Laminar flame speed is the speed at which a flame propagates within the cylinder under laminar conditions. 0-50 burn duration is the duration of a burn from a time when 0 percent of a mass of fuel within a cylinder is burned to a time when 50 percent of the fuel mass is burned.

SUMMARY

A system according to the principles of the present disclosure includes a first burn duration module and a spark control module. The first burn duration module determines a first duration of at least a portion of a fuel burn within a cylinder of an engine from a first time when a first predetermined percentage of a mass of fuel within the cylinder is burned to a second time when a second predetermined percentage of the fuel mass is burned. The spark control module controls a spark plug to adjust spark timing of the cylinder based on the first burn duration.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Engine control systems typically adjust spark timing based on engine operating conditions using a mapping (e.g., lookup table) that relate the engine operating conditions to spark timing. The mapping may be calibrated to yield an optimum spark timing that maximizes fuel economy while achieving a target torque output. The mapping assumes that intake and exhaust cam phasers are adjusted to calibrated positions corresponding to the engine operating conditions. However, in certain situations such as during transient conditions (e.g., when a vehicle is accelerating), the intake and exhaust cam phasers may be adjusted away from their calibrated positions. In these situations, the spark timing determined using the mapping may not achieve the best fuel economy possible for the current engine operating conditions.

Some engine control systems model the amount of residual trapped inside the cylinders of an engine and adjust the spark timing based on the modeled residual when the intake and exhaust cam phasers are adjusted away from their calibrated positions. Adjusting the spark timing in this way may decrease the amount by which fuel economy is degraded when the intake and exhaust cam phasers are adjusted away from their calibrated positions by relatively small amounts. However, to improve torque control, modern engine applications adjust the intake and exhaust cam phasers away from their calibrated positions by relatively large amounts (e.g., 65 degrees). Adjusting the spark timing based on the modeled residual for these applications may result in fuel economy losses, poor combustion stability, and engine knock during tip-in (acceleration) events.

A system and method according to the present disclosure uses a model-based approach to determine various parameters that characterize combustion in an engine and adjusts the spark timing of the engine based on the parameters determined. In one example, the system and method determines the laminar flame speed based on certain engine operating conditions, determines the 0-50 burn duration based on the laminar flame speed, and adjusts the spark timing based on the 0-50 burn duration. The engine operating conditions may include measured intake and exhaust cam phaser positions.

Adjusting the spark timing in this way may improve fuel economy and provide more flexibility in adjusting the intake and exhaust cam phaser positions away from their calibrated positions. In addition, since the intake and exhaust cam phaser positions are accounted for when adjusting the spark timing, the spark timing may be more precise. Therefore, the number of spark timing adjustment limits required to prevent knock may be decreased, which may improve the ease of calibrating a knock prevention system.

Figure 1:
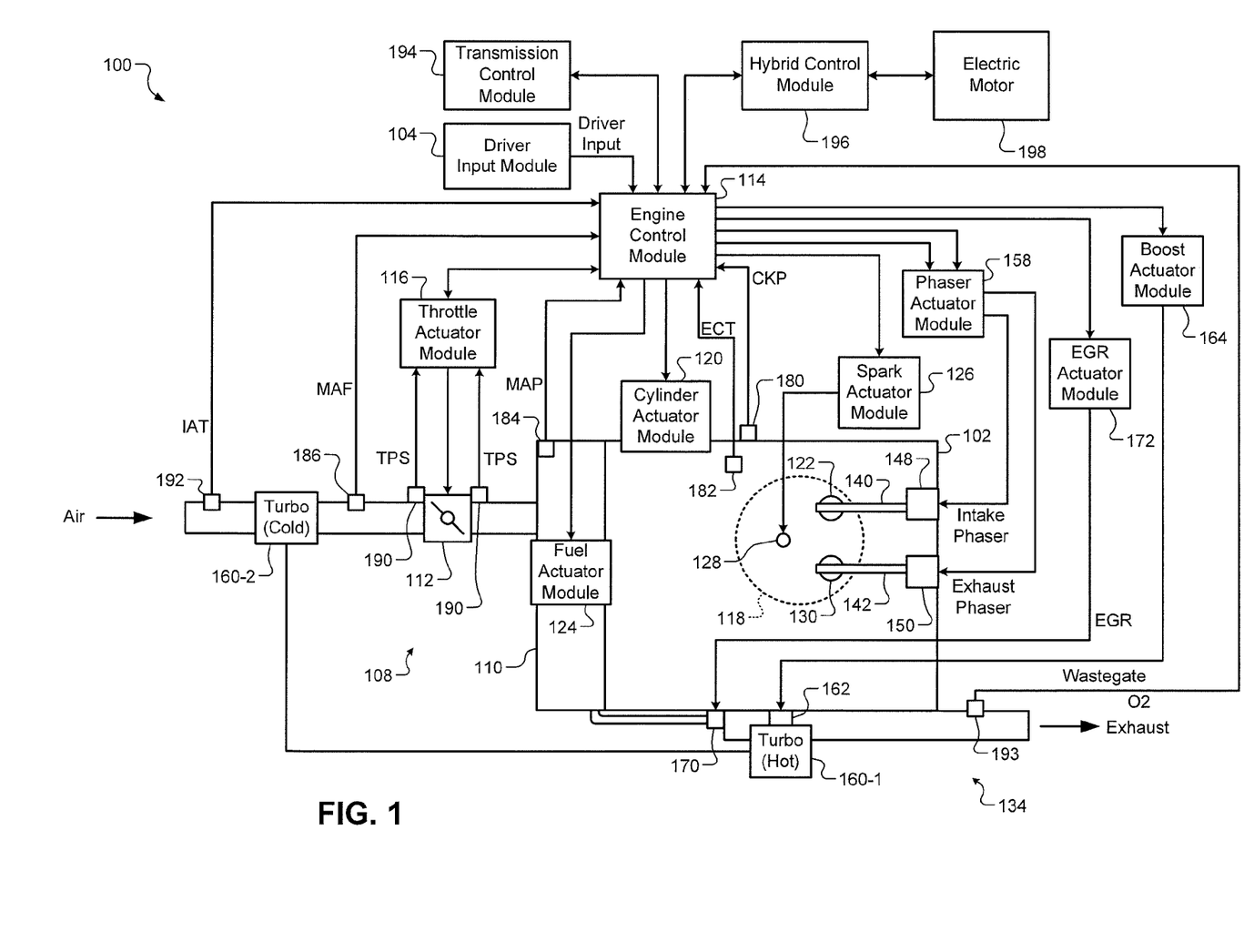
FIG. 1 is a functional block diagram of an example engine system according to the principles of the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn through an intake system 108. The intake system 108 includes an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position (CKP) sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The level of oxygen within exhaust gas produced by the engine 102 may be measured using an oxygen (O2) sensor 193. The ECM 114 uses signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders. The ECM 114 generates the target values for the engine actuators to cause the engine 102 to generate a target engine output torque.

Figure 2:
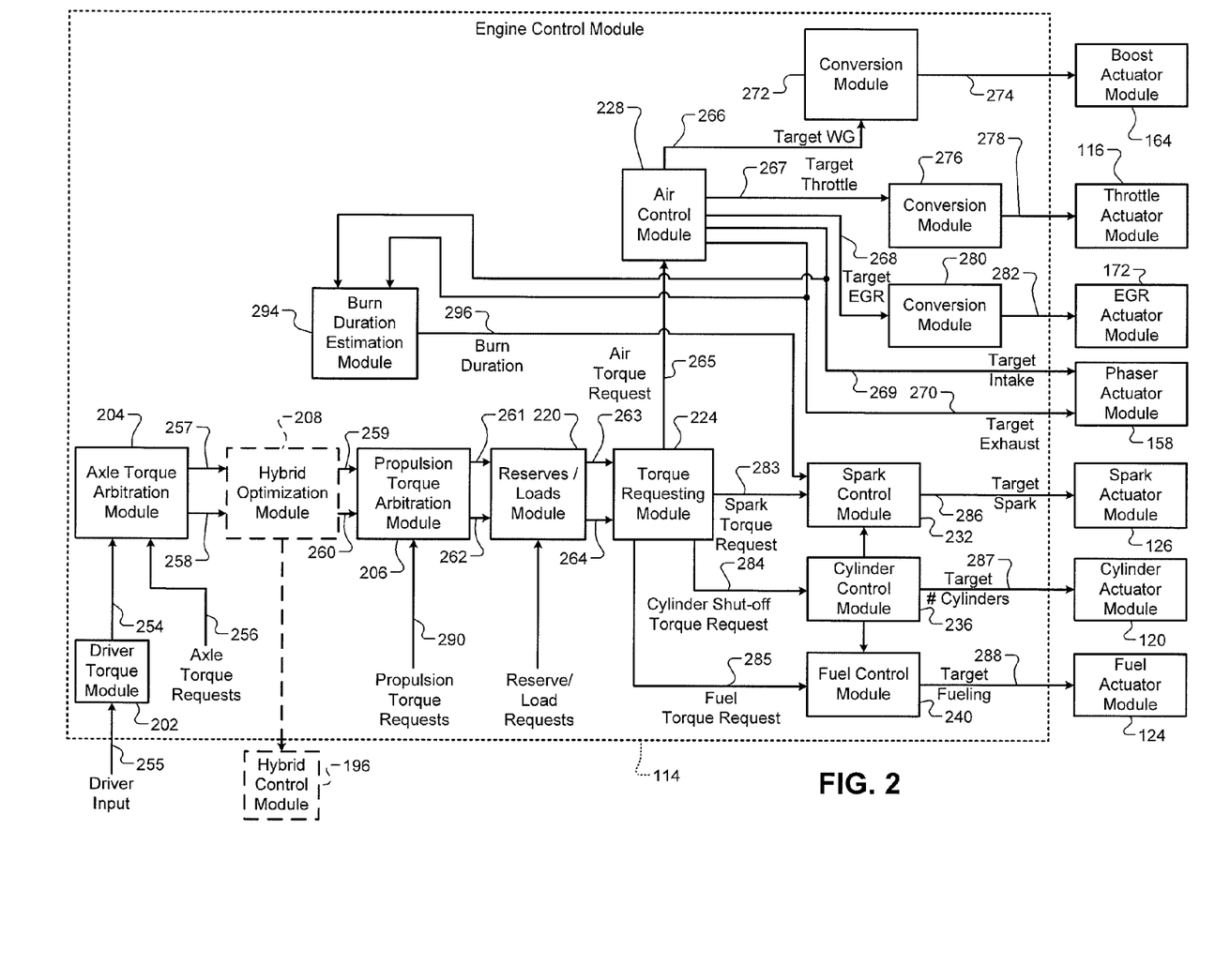
FIG. 2 is a functional block diagram of an example control system according to the principles of the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including the engine 102 and/or one or more electric motors.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

Fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum spark timing, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted and immediate torque requests 257 and 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290 and the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, spark-ignition and compression-ignition are two different types of engines. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265 and/or one or more other parameters, the air control module 228 determines a target wastegate opening area 266, a target throttle opening area 267, a target EGR opening area 268, a target intake cam phaser angle 269, and a target exhaust cam phaser angle 270. In this regard, the air control module 228 may be referred to or include a target wastegate opening area module, a target throttle opening area module, a target EGR opening area module, a target intake cam phaser angle module, and/or a target exhaust cam phaser angle module. A cam phaser angle may be referred to as a cam phaser position.

The air control module 228 may determine the target intake cam phaser angle 269 and the target exhaust cam phaser angle 270 based on engine speed and the air per cylinder (APC) using, for example, a lookup table and/or an equation. The air control module 228 may determine the engine speed based on the crankshaft position from the CKP sensor 180. The air control module 228 may divide the mass flow rate of intake air by the number of activated cylinders of the engine 102 to obtain the APC.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively.

The torque requesting module 224 also generates a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#),$$

where APC is a mass of air provided to each cylinder or mass of air per cylinder (APC), I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, which may be determined based on the oxygen level from the O2 sensor 193.

When the spark timing is set to the optimum spark timing, the resulting torque may be as close to a minimum spark advance for best torque (MBT) as possible. Best torque may refer to a maximum engine output torque that can be generated for a given airflow for various spark timings, while using fuel having an octane rating greater than a predetermined octane rating and using stoichiometric fueling. The spark timing at which the best toque occurs for a given set of airflow conditions may be referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a mapping (e.g., look up table) of optimum spark timings for different engine operating conditions may be generated during a calibration phase of vehicle design, and the ECM 114 may determine the optimum spark timing using the mapping based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present APC. APC may be determined by dividing the mass flow rate of intake air (MAF) by the number of activated cylinders.

A burn duration estimation module 294 estimates a duration 296 of at least a portion of a fuel burn within the cylinder 118. The burn duration 296 starts at a first time when a first predetermined percentage of a mass of fuel within the cylinder 118 is burned and ends at a second time when a second predetermined percentage of the fuel mass is burned. The first predetermined percentage may be 0 percent and the second predetermined percentage may be 50 percent, in which case the burn duration 296 may be referred to as a 0-50 burn duration.

Figure 3:
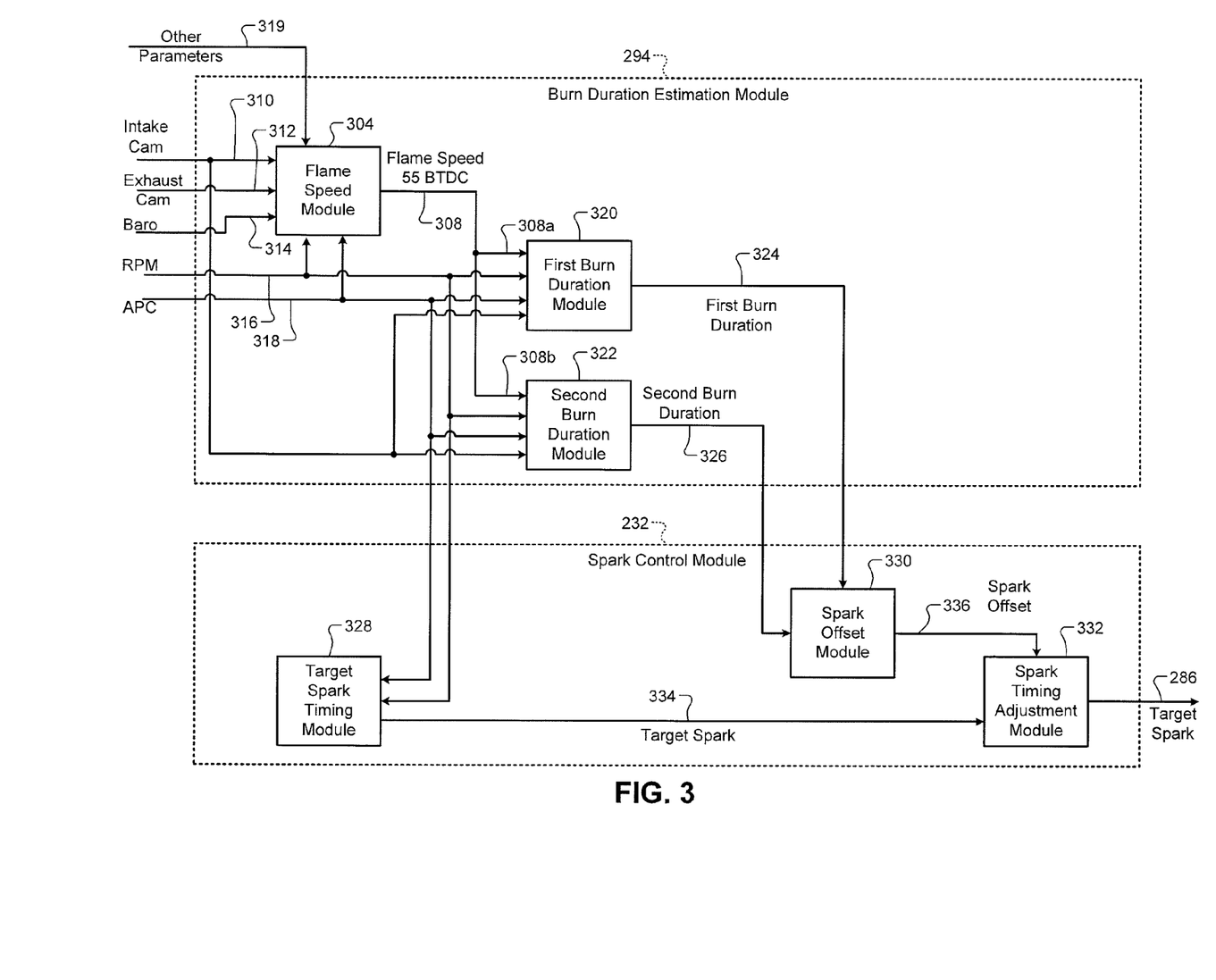
FIG. 3 is a functional block diagram of an example burn duration estimation module and an example spark control module according to the principles of the present disclosure.

Referring now to FIG. 3, an example implementation of the burn duration estimation module 294 includes a flame speed module 304. The flame speed module 304 determines a flame (e.g., laminar) speed 308 at 55 degrees before TDC (BTDC) of the compression/combustion stroke. The flame speed module 304 may update the flame speed 308 at 55 degrees BTDC for each combustion event. The flame speed 308 may also be referred to as combustion speed. While the example of the flame speed 308 at 55 degrees BTDC is provided, the flame speed at another predetermined crankshaft angle may be used.

The flame speed module 304 determines the flame speed 308 based on an intake cam phaser angle 310, an exhaust cam phaser angle 312, a barometric pressure 314, an engine speed 316, and an APC 318. The flame speed module 304 may determine the flame speed 308 at 55 degrees BTDC further based on one or more other parameters 319. The other parameters 319 may include, for example, an EGR value (e.g., EGR valve opening, EGR flow rate), an amount of residual exhaust gas within the cylinder, the MAP, an air temperature within the intake manifold 110, an equivalence ratio of fueling, a type of fuel being used, and/or one or more other parameters. The flame speed module 304 may determine the flame speed 308 using one of a function and a mapping that relates intake cam phaser angles, exhaust cam phaser angles, barometric pressures, engine speeds, and APCs to flame speeds. In various implementations, one or more of the other parameters 319 may also be used as inputs to the function or mapping. The function or mapping may be calibrated, for example, using an artificial neural network (ANN) or in another suitable manner.

The intake cam phaser angle 310 may be, for example, measured using a sensor or the target intake cam phaser angle 269 may be used. The exhaust cam phaser angle 312 may be, for example, measured using a sensor or the target exhaust cam phaser angle 270 may be used. The barometric pressure 314 may be, for example, measured using a sensor or determined based on one or more other parameters. The engine speed 316 may be determined, for example, based on the crankshaft position signal generated by the CKP sensor 180. The APC 318 may be determined, for example, using a function or a mapping that relates MAFs measured using the MAF sensor 186 and the number of activated cylinders to APCs.

In various implementations, the flame speed module 304 may determine the flame speed 308 based on various parameters characterizing conditions in a cylinder during a combustion event. The parameters may include the amount of air trapped within the cylinder (i.e., trapped APC), the amount of residual trapped within the cylinder, the pressure in the cylinder, and the temperature in the cylinder. The flame speed module 304 may determine these parameters based on the inputs to the flame speed module 304 using, for example, a function or mapping that relates the inputs to the parameters. As noted above, the inputs to the flame speed module 304 include the intake cam phaser angle 310, the exhaust cam phaser angle 312, the barometric pressure 314, the engine speed 316, and the APC 318.

In various implementations, the flame speed module 304 may determine the flame speed 308 using a relationship such as $$S_L = B_m + B_\phi (\phi - \phi_m)_2,$$

where $S_L$ is the (laminar) flame speed 308, $B_m$ is a predetermined value (e.g., 30.5 centimeters per seconds (cm/s)) for gasoline, $B_\phi$ is a predetermined value (e.g., -54.9 54.9 cm/s) for gasoline, $\phi$ is the actual equivalence ratio, and $\phi_m$ is a predetermined value (e.g., 1.21) representing the maximum flame speed equivalence ratio for gasoline. The flame speed module 304 may determine the actual equivalence ratio based on the oxygen level from the O2 sensor 193.

In the example implementation of the burn duration estimation module 294 shown in FIG. 3, the flame speed 308 determined by the flame speed module 304 includes a first flame speed 308a and a second flame speed 308b. The flame speed module 304 may determine the first flame speed 308a based on measured intake and exhaust cam phaser angles, and the flame speed module 304 may determine the second flame speed 308b based on the target intake and exhaust cam phaser angles 269 and 270. In this regard, the first flame speed 308a may be referred to as a current flame speed, while the second flame speed 308b may be referred to as an estimated flame speed. In addition, the second flame speed 308b may be different than the first flame speed 308a. Further, although the flame speed 308 is depicted as splitting into the first flame speed 308a and the second flame speed 208b, the first flame speed 308a and the second flame speed 308b may be entirely separate and distinct signals that are sent from the flame speed module 304 to the first and second burn duration modules 320 and 322, respectively.

As noted above, the intake and exhaust cam phaser angles 310 and 312 may be measured. Thus, the flame speed module 304 may determine the first flame speed 308a based on the (measured) intake and exhaust cam phaser angles 310 and 312, the barometric pressure 314, the engine speed 316, and the APC 318. In addition, the intake and exhaust cam phaser angles 310 and 312 may represent the target intake and exhaust cam phaser angles 269 and 270, respectively. Thus, the flame speed module 304 may determine the second flame speed 308b based on the (target) intake and exhaust cam phaser angles 310 and 312, the barometric pressure 314, the engine speed 316, and the APC 318.

The example implementation of the burn duration estimation module 294 shown in FIG. 3 further includes a first burn duration module 320 and a second burn duration module 322. The first burn duration module 320 determines a first burn duration 324 based on the first flame speed 308a, the engine speed 316, the APC 318 and an effective compression ratio of the cylinder 118 using, for example, a function or a mapping. The function or mapping may be calibrated, for example, using an artificial neural network (ANN) or in another suitable manner.

The effective compression of a cylinder is the ratio of the volume of a cylinder when an intake valve of the cylinder is closed to the volume of the cylinder at TDC. The crankshaft angle at which the intake valve 122 of the cylinder 118 is closed may be determined based on the intake cam phaser angle 310. The volume of the cylinder 118 when the intake valve 122 is closed and the volume of the cylinder 118 at TDC may be determined using a mapping that relates the crankshaft angle to the cylinder volume.

The second burn duration module 322 determines a second burn duration 326 based on the second flame speed 308b, the engine speed 316, the APC 318, and the effective compression ratio of the cylinder 118 using, for example, a function or a mapping. The function or mapping may be calibrated, for example, using an artificial neural network (ANN) or in another suitable manner. The burn duration 296 of FIG. 2 may include the first and second burn durations 324 and 326. Since the first and second burn durations 324 and 326 are determined based on the first (current) and second (estimated) flame speeds 308*a* and 308*b*, respectively, the burn durations 324 and 326 may be referred to as current and estimated burn durations, respectively.

In various implementations, the function(s) or mapping(s) used to determine the first and second burn durations 324 and 326 may be calibrated in a laboratory setting using a dynamometer. During the calibration, the pressure within the cylinder 118 may be measured using an in-cylinder pressure transducer, and a (0-50) burn duration may be determined based on the resulting pressure trace. This calibration procedure may be repeated for various flame speeds, engine speeds, APCs, and effective compression ratios to develop a mapping that relates these parameters to the burn duration.

FIG. 3 also shows an example implementation of the spark control module 232. The example implementation of the spark control module 232 includes a target spark timing module 328, a spark offset module 330, and a spark timing adjustment module 332. The target spark timing module 328 determines a target spark timing 334 based on the engine speed 316 and the APC 318 using, for example, a function or a mapping.

The spark offset module 330 determines a spark timing offset 336 based on a difference between the first burn duration 324 and the second burn duration 326. For example, the spark offset module 330 may subtract the second burn duration 326 from the first burn duration 324, and set the spark timing offset 336 equal to the resulting difference. In other words, the spark offset module 330 may set the spark timing offset 336 equal to the first burn duration 324 minus the second burn duration 326.

The spark timing adjustment module 332 adjusts the target spark timing 334 based on the spark timing offset 336 and outputs adjusted target spark timing 334 as the target spark timing 286. For example, the spark timing adjustment module 332 may adjust the target spark timing 334 by adding the spark timing offset 336 to the target spark timing 334. The spark timing adjustment module 332 may output the sum of the target spark timing 334 and the spark timing offset 336 as the target spark timing 286.

In the above example, the spark timing adjustment module 332 adjusts the target spark timing 334 based on a difference between the first and second burn durations 324 and 326, which are determined based on current and target cam phaser angles, respectively. In various implementations, the spark timing adjustment module 332 may also adjusting the target spark timing 334 based on a difference between current and target values of one or more other engine operating conditions. The other engine operating conditions may include air/fuel ratio, EGR opening area, fuel type, and start-of-injection (SOI) timing.

Figure 4:
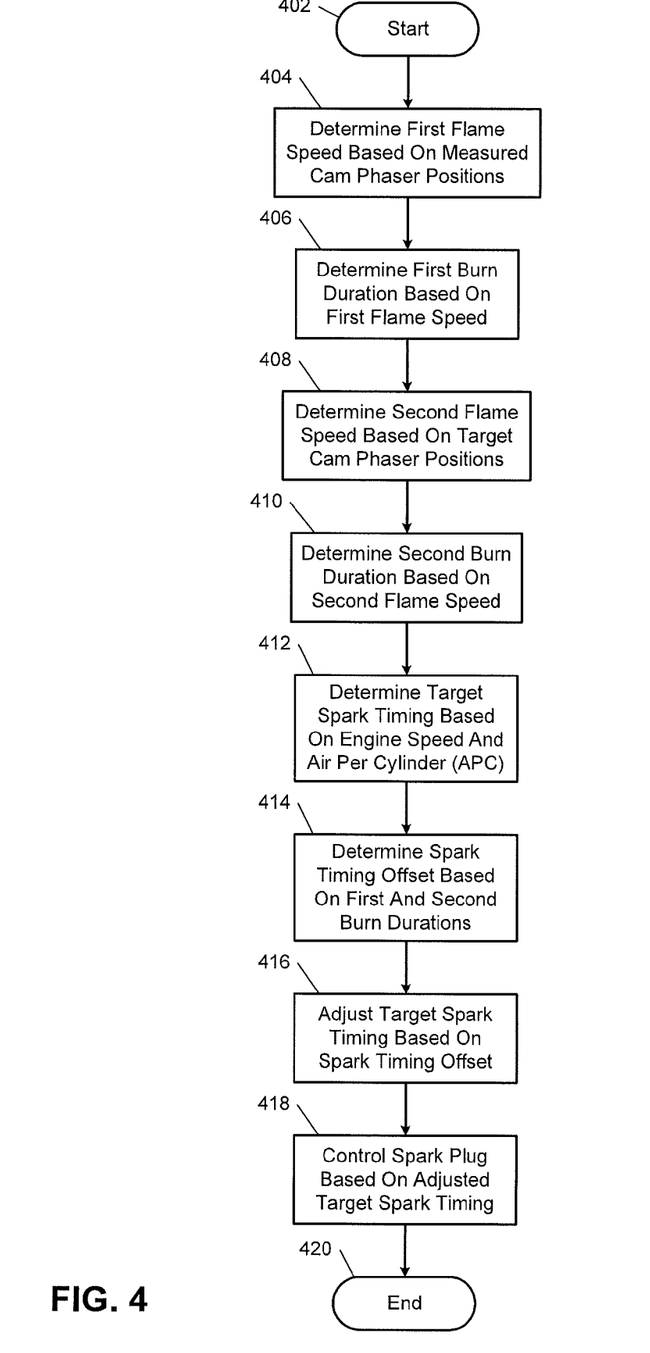
FIG. 4 is a flowchart illustrating an example method of controlling spark timing according to the principles of the present disclosure.

Referring now to FIG. 4, an example method of controlling spark timing based on a duration of a fuel burn within a cylinder of an engine begins at 402. The method is described in the context of the modules of FIG. 3. However, the particular modules that perform the steps of the method may be different than the modules mentioned below and/or the method may be implemented apart from the modules of FIG. 3.

At 404, the flame speed module 304 determines the first flame speed 308*a* based on the (measured) intake and exhaust cam phaser angles 310 and 312, the barometric pressure 314, the engine speed 316, and the APC 318 using, for example, a function or a mapping. At 406, the first burn duration module 320 determines the first burn duration 324 based on the first flame speed 308*a*, the engine speed 316, and the APC 318 using, for example, a function or a mapping.

At 408, the flame speed module 304 determines the second flame speed 308*b* based on the target intake and exhaust cam phaser angles 269 and 270, the barometric pressure 314, the engine speed 316, and the APC 318 using, for example, a function or a mapping. At 410, the second burn duration module 322 determines the second burn duration 326 based on the second flame speed 308*b*, the engine speed 316, and the APC 318 using, for example, a function or a mapping.

At 412, the target spark timing module 328 determines the target spark timing 334 based on the engine speed 316 and the APC 318 using, for example, a function or a mapping. At 414, the spark offset module 330 determines the spark timing offset 336 based on a difference between the first burn duration 324 minus the second burn duration 326. For example, the spark offset module 330 may set the spark timing offset 336 equal to the first burn duration 324 minus the second burn duration 326.

At 416, the spark timing adjustment module 332 adjusts the target spark timing 334 based on the spark timing offset 336. For example, the spark timing adjustment module 332 may adjust the target spark timing 334 by adding the spark timing offset 336 to the target spark timing 334. At 418, the spark control module 232 controls the spark plug 128 based on the target spark timing 334 as adjusted. For example, the spark control module 232 may set the target spark timing 286 equal to the target spark timing 334 as adjusted, and output the target spark timing 286 to the spark actuator module 126 to control the spark plug 128 based on the target spark timing 286.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
a first burn duration module that determines a first duration of at least a portion of a fuel burn within a cylinder of an engine from a first time when a first predetermined percentage of a mass of fuel within the cylinder is burned to a second time when a second predetermined percentage of the fuel mass is burned; and
a spark control module that controls a spark plug to adjust spark timing of the cylinder based on the first burn duration, wherein the first burn duration module determines the first burn duration based on a measured position of an intake cam phaser associated with the cylinder and a measured position of an exhaust cam phaser associated with the cylinder.

2. The system of claim 1 further comprising a second burn duration module that determines a second duration of the fuel burn from the first time to the second time based on a target position of the intake cam phaser and a target position of the exhaust cam phaser, wherein the spark control module adjust the spark timing based on the first and second burn durations.

3. The system of claim 2 further comprising a target phaser position module that determines the target positions of the intake and exhaust cam phasers based on engine speed and an amount of air provided to the cylinder.

4. The system of claim 2 wherein the spark control module adjusts the spark timing based on a difference between the first burn duration and the second burn duration.

5. The system of claim 4 wherein the spark control module adjusts the spark timing by an amount that is equal to the first burn duration minus the second burn duration.

6. The system of claim 2 wherein the first burn duration module determines the first burn duration based on a first flame speed, engine speed, an amount of air provided to the cylinder, and an effective compression ratio of the engine.

7. The system of claim 6 further comprising a flame speed module that determines the first flame speed based on the engine speed, the amount of air provided to the cylinder, the measured intake cam phaser position, the measured exhaust cam phaser position, and barometric pressure.

8. The system of claim 7 wherein the second burn duration module determines the second burn duration based on a second flame speed, the engine speed, the amount of air provided to the cylinder, and the effective compression ratio of the engine.

9. The system of claim 8 wherein the flame speed module determines the second flame speed based on the engine speed, the amount of air provided to the cylinder, the target intake cam phaser position, the target exhaust cam phaser position, and the barometric pressure.

10. A method comprising:
determining a first duration of at least a portion of a fuel burn within a cylinder of an engine from a first time when a first predetermined percentage of a mass of fuel within the cylinder is burned to a second time when a second predetermined percentage of the fuel mass is burned;

determining the first burn duration based on a measured position of an intake cam phaser associated with the cylinder and a measured position of an exhaust cam phaser associated with the cylinder; and controlling a spark plug to adjust spark timing of the cylinder based on the first burn duration.

11. The method of claim 10 further comprising:

determining a second duration of the fuel burn from the first time to the second time based on a target position of the intake cam phaser and a target position of the exhaust cam phaser; and adjusting the spark timing based on the first and second burn durations.

12. The method of claim 11 further comprising determining the target positions of the intake and exhaust cam phasers based on engine speed and an amount of air provided to the cylinder.

13. The method of claim 11 further comprising adjusting the spark timing based on a difference between the first burn duration and the second burn duration.

14. The method of claim 13 further comprising adjusting the spark timing by an amount that is equal to the first burn duration minus the second burn duration.

15. The method of claim 11 further comprising determining the first burn duration based on a first flame speed, engine speed, an amount of air provided to the cylinder, and an effective compression ratio of the engine.

16. The method of claim 15 further comprising determining the first flame speed based on the engine speed, the amount of air provided to the cylinder, the measured intake cam phaser position, the measured exhaust cam phaser position, and barometric pressure.

17. The method of claim 16 further comprising determining the second burn duration based on a second flame speed, the engine speed, the amount of air provided to the cylinder, and the effective compression ratio of the engine.

18. The method of claim 17 further comprising determining the second flame speed based on the engine speed, the amount of air provided to the cylinder, the target intake cam phaser position, the target exhaust cam phaser position, and the barometric pressure.

* * * * *